United States Patent [19]

Wallace

[11] 4,198,738

[45] Apr. 22, 1980

[54] TOOL TO INSTALL ELBOW JOINT AND CLAMP

[76] Inventor: Jerry L. Wallace, 240 N. Ashland Ave., Michigan City, Ind. 46360

[21] Appl. No.: 895,796

[22] Filed: Apr. 12, 1978

[51] Int. Cl.$^2$ .............................................. B23P 19/04

[52] U.S. Cl. ........................................ 29/268; 29/237; 81/425 A

[58] Field of Search ......................... 29/268, 237, 239; 81/5.1 R, 425 R, 425 A, 426

[56] References Cited

U.S. PATENT DOCUMENTS

| | | | |
|---|---|---|---|
| 1,085,461 | 1/1914 | Michaelis | 81/5.1 R |
| 3,571,894 | 3/1971 | Bilka | 29/268 |

FOREIGN PATENT DOCUMENTS

| | | | |
|---|---|---|---|
| 703853 | 2/1954 | United Kingdom | 29/268 |

*Primary Examiner*—James L. Jones, Jr.
*Attorney, Agent, or Firm*—LeBlanc, Nolan, Shur & Nies

[57] ABSTRACT

A special purpose tool for assembling an elbow joint wherein a rubber gasket is compressed into a collar surrounding a pipe and the collar secured against the elbow member flange so that a clamp may be affixed is disclosed. The device consists of opposed, bifurcated jaws, each jaw having an integral lever and a common adjustable pivot for said levers, said jaws being bifurcated to define arcuate configuration with an upper and a lower gripping flange extending outwardly from, respectively, the upper and lower jaws of said device. The gripping flanges urge the collar and elbow flange together so that a clamp may be affixed therearound.

3 Claims, 7 Drawing Figures

FIG 1
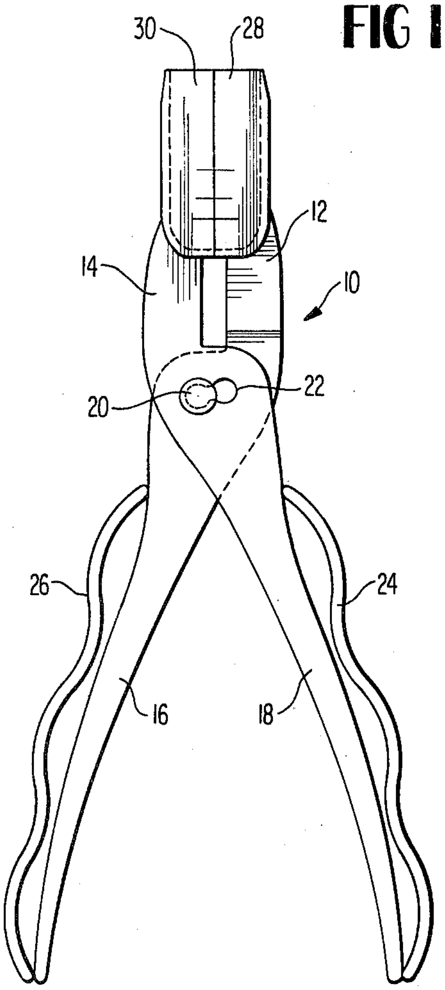
FIG 2
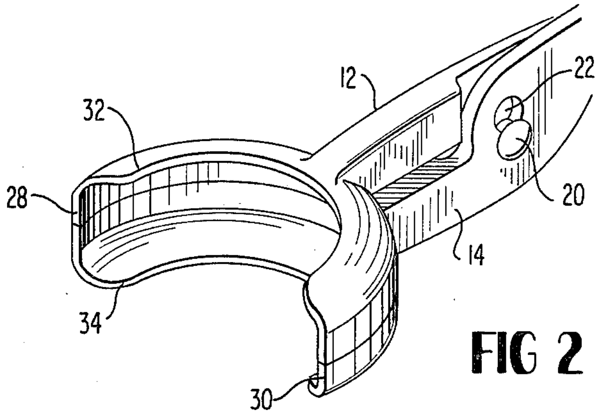
FIG 3
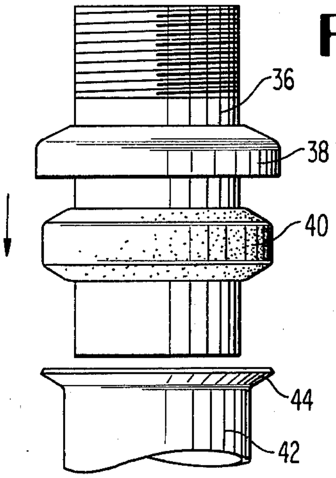
FIG 4
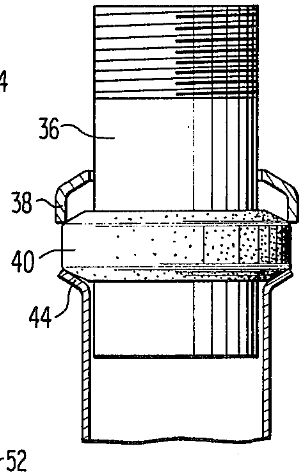
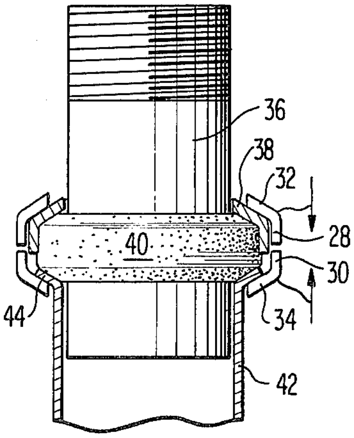
FIG 5
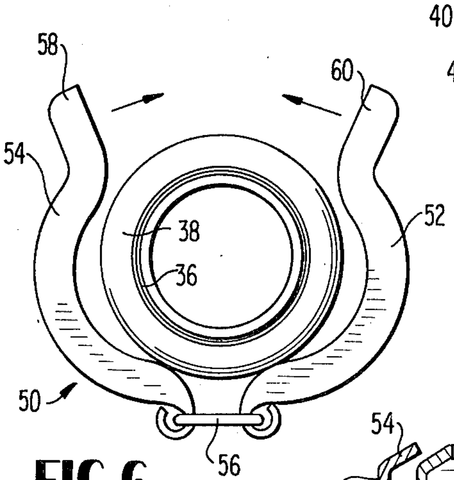
FIG 6
FIG 7
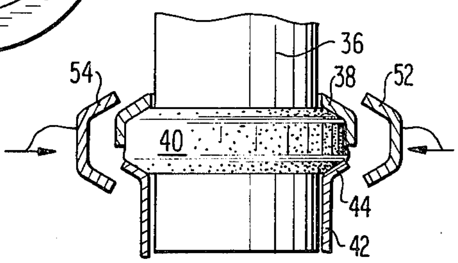

TOOL TO INSTALL ELBOW JOINT AND CLAMP

This invention relates to a special purpose tool for assembling elbow flanges such as the flex elbow manufactured by Aero Quip Corp., AMB Division, Jackson, Mich. In assembling such a joint, a heavy rubber gasket is placed around the pipe and a collar disposed over the gasket. The elbow includes an integral mounting flange. The joint then must be forced together until the collar is flush or nearly flush with the flange compressing the gasket so that a ring clamp may be disposed therearound and secured with a bolt and lock nut.

It has been the usual procedure in the past to utilize only conventional tools to manually assemble such joints. Accordingly, assembly of such a joint in the past involved the high likelihood of damage to the fingers and hands by pinching. In order to eliminate such injuries then, there exists a need for a special purpose tool to assemble such joints.

Special purpose bifurcated clamp type tools are known in the art of, for example, welding. For example, in U.S. Pat. No. 1,781,419, a bifurcated jaw with integral levers is disclosed. The jaws are bifurcated by a slot so that sheet metal may be gripped and welded. U.S. Pat. No. 2,731,932, also discloses bifurcated gripping members utilized to hold articles to be welded. Neither of the above mentioned devices however may be utilized in assembling a pipe joint due to the special configuration thereof necessitated by the intended purpose, i.e., utilization as a welding clamp.

It has been discovered however that such joints may be rapidly and efficiently assembled by the special tool of this invention which defines bifurcated jaws adapted to receive both the elbow and the pipe member, and in addition, by the provision of upper and lower gripping flanges.

The tool of this invention may then be utilized to assemble such a joint whereby manual pressure on the levers will be translated through a common pivot to upper and lower gripping flanges which exert a compressive force on the collar and corresponding mounting flange to thereby compress the rubber gasket and assemble the joint so that a ring clamp can be mounted thereon.

Accordingly, it is an object of this invention to provide a special purpose tool which may be utilized to rapidly and efficiently assemble elbow joints.

It is another object of this invention to provide a special purpose tool having upper and lower gripping flanges adapted to exert a compressive force on a partially assembled joint whereby said joint is assembled.

It is yet another object of this invention to provide a tool for applying manual pressure exerted on opposed levers through a common pivot to upper and lower assembly members to compress a rubber gasket therebetween whereby said members may be drawn together by said tool.

These and other objects will become readily apparent with reference to the drawings and following description wherein FIG. 1 is a plan view of the device of this invention.

FIG. 2 is a fragmentary perspective view of the device of this invention.

FIG. 3 is a fragmentary, exploded view of an elbow joint prior to assembly.

FIG. 4 is a fragmentary view of the device of FIG. 3 in partial section and partially assembled.

FIG. 5 is a fragmentary view in partial section of the joint of FIG. 4 showing assembly with the device of this invention.

FIG. 6 is a top view of the joint of FIG. 5 illustrating assembly of the clamp.

FIG. 7 is a fragmentary view in partial section illustrating the assembly of the joint of FIG. 6.

With attention to the drawings and in particular to FIG. 1, the device of this invention 10 comprises upper and lower jaw members 12 and 14 having integral lever members 16 and 18 interconnected by a common pivot 20. A slot 22 may also be formed whereby the separation of jaw members 12 and 14 may be adjusted in a conventional fashion. Hand gripping members 24 and 26 may be provided on levers 16 and 18, as desired. Jaws 12 and 14 mount upper and lower bifurcated members 28 and 30.

With attention to FIG. 2, bifurcated members 28 and 30 are arcuate in configuration, and mount respectively, inwardly directing upper and lower arcuate gripping members 32 and 34. As will be subsequently explained, members 32 and 34 are intended to grip respectively a collar and flange and permit compression thereof by translating compressive forces exerted on levers 16 and 18 thereto through the common pivot 20.

With reference to FIG. 3, a flex elbow joint comprises a pipe 36, a collar 38 slidably mounted thereon, and a heavy rubber gasket 40. An elbow 42 also mounts an integral flange 44.

As shown in FIG. 4, partial assembly in the direction shown in FIG. 3 will result in disposing the collar 38, gasket 40, and flange 44 in a partially assembled position. However, in this position, gasket 40 is not compressed and as shown in FIG. 4, collar 38 and flange 44 are spaced apart.

With attention to FIGS. 5, 6 and 7, when the collar 38 and flange 44 are received within the bifurcated members 28 and 30 so that gripping flanges 32 and 34 ride thereon, compressive pressure on levers 16 and 18 will result in movement of arcuate flanges 32 and 34 in the direction shown in FIG. 5. This movement will then result in compression of gasket 40 into collar 38 whereby collar 38 and flange 44 may be drawn together. If desired, gasket 40 may be coated with soap or another lubricant in order to assist in this movement. FIGS. 6 and 7 illustrate a conventional ring clamp 50 comprising right and left arcuate members 52 and 54 with an interconnecting link 56 and extension members 58 and 60. Clamp 50 is then substituted for the device of this invention 10, and in the conventional fashion, after collar 38 and flange 44 have been drawn together, ring clamp 50 may be disposed therearound as shown in FIG. 6. With attention to FIG. 7, ring 50 is dimensioned so that members 52 and 54 will receive collar 38 and flange 44 therein. The ring clamp 50 is then secured by passing a conventional bolt (not shown) through extension members 58 and 60 and affixing a lock nut (also not shown) thereto in the conventional fashion.

In summary then, the device of this invention utilizes cooperating jaws having integral arcuate extensions which mount arcuate inwardly directed cooperating gripping flanges. The device of this invention then is intended to receive a partially assembled flex joint for a pipe elbow so that compressive forces on integral levers will be translated through a common pivot to the gripping flanges to compress and assemble the joint so that a ring clamp may be affixed thereto. Once the ring clamp is affixed, the joint is fully assembled. However, prior to this invention, said joint was assembled by hand, using a hammer, or the like to force the collar portion over the rubber gasket and compress the gasket against the pipe.

By utilizing the device of the instant invention however additional tools are not necessary, and injuries to the fingers and hands normally associated with the assembly of such joints are eliminated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced herein.

I claim:

1. In the combination of a pipe and elbow joint and tool for assembly thereof wherein said joint consists of a pipe, a collar having a cylindrical side wall mounting an inwardly directed flange, slidable thereon, a mounting flange integral with said elbow and a heavy rubber gasket normally compressed within the collar and abutting the flange when said joint is assembled, the improvement comprising:

opposed jaws having integral levers extending therefrom, and a common pivot means interconnecting said levers for translating a compressive force on said levers to a compressive force on said jaws; upper and lower arcuately bifurcated gripping members mounted on said jaws, and means carried by said members for engaging, respectively, at least a portion of the upper surfaces of said collar and at least a portion of the lower surface of said flange, said means comprising upper and lower arcuate support members opening outwardly and extending from the end portion of said jaws opposite said common pivot means and an upper and a lower, arcuate, inwardly extending flange, said flanges mounted, respectively, on the upper and lower support members and extending normal thereto to form with said support members opposed, arcuate gripping and holding surfaces substantially L-shaped in cross section symmetrical with said pipe and elbow with one support member and flange adapted to engage respectively at least a portion of the collar side wall and inwardly directed flange and the other flange engaging the elbow mounting flange, whereby when said members engage, respectively a collar and a mounting flange with a rubber gasket therebetween a compressive force on said levers will be translated through said jaws to draw said collar and flange together.

2. The device of claim 1 wherein the arc defined by said bifurcated members is about 180°.

3. The device of claim 2 wherein said jaws mount said arcuately bifurcated members at the mid-point of said arc.

* * * * *